United States Patent
Kobayashi et al.

(10) Patent No.: US 10,243,230 B2
(45) Date of Patent: Mar. 26, 2019

(54) FUEL BATTERY

(71) Applicant: TOYOTA JIDOSHA KABUSHIKI KAISHA, Toyota-shi, Aichi-ken (JP)

(72) Inventors: Masaya Kobayashi, Toyota (JP); Daisuke Kanno, Toyota (JP); Tomoo Yoshizumi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/936,447

(22) Filed: Nov. 9, 2015

(65) Prior Publication Data

US 2016/0133983 A1    May 12, 2016

(30) Foreign Application Priority Data

Nov. 10, 2014 (JP) .................. 2014-228187

(51) Int. Cl.
  *H01M 8/24* (2016.01)
  *H01M 8/2465* (2016.01)
  *H01M 8/0206* (2016.01)

(52) U.S. Cl.
  CPC ....... *H01M 8/2465* (2013.01); *H01M 8/0206* (2013.01)

(58) Field of Classification Search
  None
  See application file for complete search history.

(56) References Cited

U.S. PATENT DOCUMENTS

| 7,687,175 | B2 | 3/2010 | Abd Elhamid et al. |
| 8,323,851 | B2 | 12/2012 | Andreas-Schott et al. |
| 2005/0260479 | A1 | 11/2005 | Raiser et al. |
| 2007/0264556 | A1 | 11/2007 | Andreas-Schott et al. |
| 2008/0241620 | A1 | 10/2008 | Ham et al. |
| 2009/0317673 | A1 | 12/2009 | Cha et al. |
| 2014/0234742 | A1 | 8/2014 | Terada et al. |
| 2016/0141633 | A1 | 5/2016 | Kanno et al. |

FOREIGN PATENT DOCUMENTS

| CA | 2 711 210 A1 | 2/2011 |
| CN | 101075689 A | 11/2007 |
| DE | 10 2009 036 039 A1 | 2/2011 |
| EP | 1 511 105 A1 | 3/2005 |
| JP | S58-10378 Y | 2/1963 |

(Continued)

OTHER PUBLICATIONS

Final Office Action issued in U.S. Appl. No. 14/939,866 dated Nov. 24, 2017.

(Continued)

*Primary Examiner* — Wyatt P McConnell
(74) *Attorney, Agent, or Firm* — Finnegan, Henderson, Farabow, Garrett & Dunner, LLP

(57) ABSTRACT

A fuel battery 11 includes a cell laminated body 21 including lamination of a plurality of cells 20, a current-collecting plate 22 disposed at an end of the cell laminated body 21, the current-collecting plate being made of a metal material, and an anti-rust plate 23 disposed between the cell laminated body 21 and the current-collecting plate 22, the anti-rust plate being made of a metal material that is different from the metal material of the current-collecting plate 22. The anti-rust plate 23 includes a protrusion 31, and the current-collecting plate 22 includes a fitting hole 41, into which the protrusion 31 is fitted.

1 Claim, 6 Drawing Sheets

(56) References Cited

FOREIGN PATENT DOCUMENTS

| | | |
|---|---|---|
| JP | 58-10378 | 1/1983 |
| JP | 2002-042829 A | 2/2002 |
| JP | 2003-526891 A | 9/2003 |
| JP | 2005-293874 A | 10/2005 |
| JP | 2006-279198 A | 10/2006 |
| JP | 2007-87766 | 4/2007 |
| JP | 2007-311343 A | 11/2007 |
| JP | 2009-123446 A | 6/2009 |

OTHER PUBLICATIONS

Notice of Allowance issued in U.S. Appl. No. 14/939,866 dated Mar. 27, 2018.
Corrected Notice of Allowability issued in U.S. Appl. No. 14/939,866 dated Apr. 5, 2018.

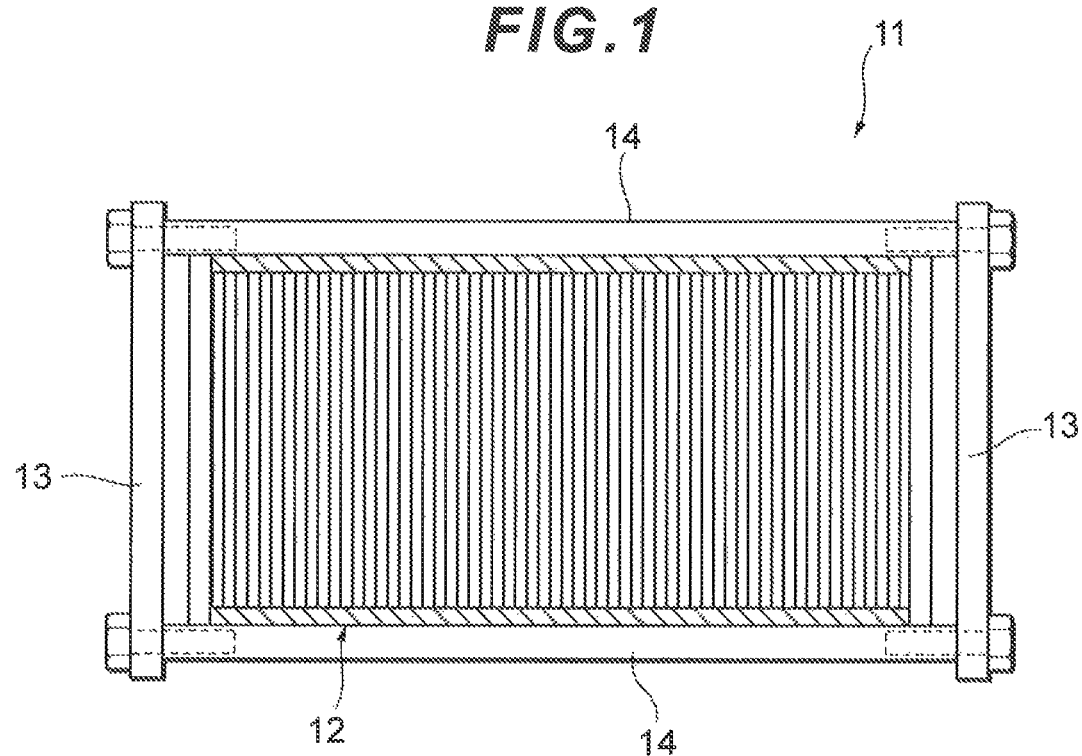
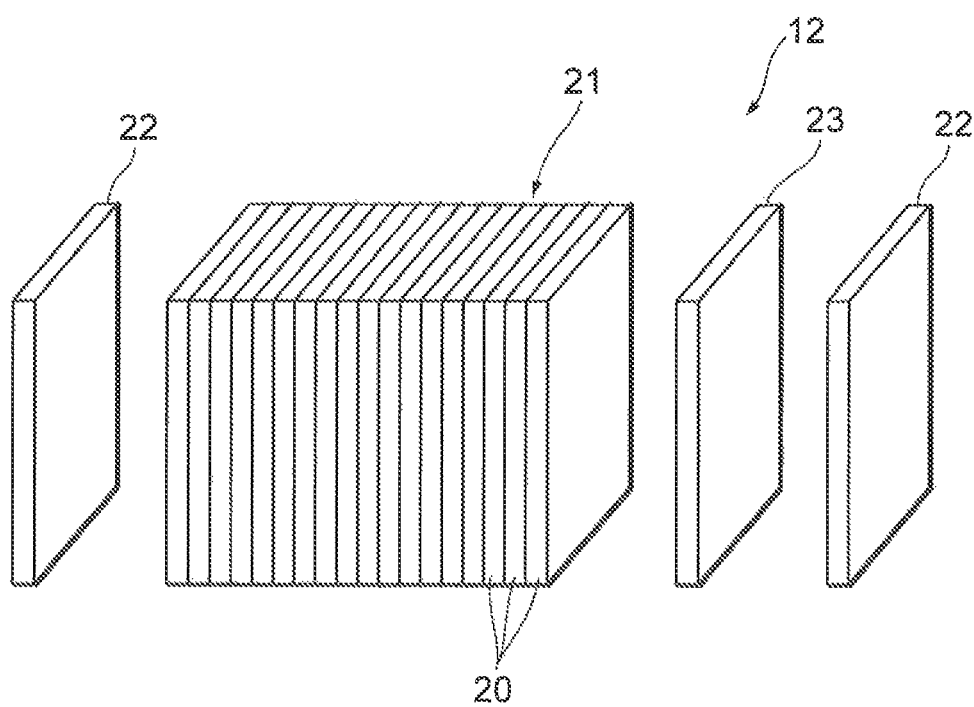

FUEL BATTERY

BACKGROUND OF THE INVENTION

Field of the Invention

The present invention relates to a fuel battery provided with a cell laminated body including the lamination of cells.

Background Art

A fuel cell stack making up a fuel battery includes the lamination of a cell laminated body that is a plurality of cells laminated, each cell being made up of a membrane electrode assembly sandwiched between plate-shaped separators from their both sides, and current-collecting plates placed on both sides of the cell laminated body, and includes an anti-rust plate including a sacrificial plate placed between the cell laminated body and a current-collecting plate (see Patent Document 1, for example).

CITATION LIST

Patent Document

[Patent Document 1] JP2007-87766 A

SUMMARY OF THE INVENTION

An anti-rust plate is held while being pressurized and sandwiched between the cell laminated body and the current-collecting plate. If the anti-rust plate and the current-collecting plate are made of different metals, then the anti-rust plate may be shifted in the planar direction and be displaced due to imbalanced temperature distribution during power generation and a difference in thermal expansion between the different types of metals. In this case, a mechanism may be disposed around the fuel cell stack so as to suppress the displacement of the anti-rust plate, for example. However, the fuel battery provided with such a mechanism to suppress displacement will increase in size.

In view of such circumstances, the present invention aims to provide a fuel battery capable of suppressing displacement of an anti-rust plate without upsizing the fuel battery.

To fulfill the above-stated object, a fuel battery of the present invention includes a cell laminated body including lamination of a plurality of cells, a current-collecting plate disposed at an end of the cell laminated body, the current-collecting plate being made of a metal material, and an anti-rust plate disposed between the cell laminated body and the current-collecting plate, the anti-rust plate being made of a metal material that is different from the metal material of the current-collecting plate. One of the current-collecting plate and the anti-rust plate includes at least one protrusion, and the other of the current-collecting plate and the anti-rust plate includes a fitting hole, into which the protrusion is fitted.

According to the thus configured fuel battery, the protrusion is fitted into the fitting hole, which can suppress displacement in a planar direction resulting from a difference in thermal expansion, for example, of the anti-rust plate disposed between the cell laminated body and the current-collecting plate from that of the current-collecting plate. This can suppress a problem, which may occur when the displaced anti-rust plate comes into contact with a component therearound. Further as compared with the case of disposing a mechanism to suppress displacement of the anti-rust plate around the current-collecting part including the current-collecting plates, an increase in size of the fuel battery can be suppressed.

In the fuel battery of the present invention, the protrusion may be disposed so as to protrude from the anti-rust plate toward the current-collecting plate side, and the fitting hole may be disposed in the current-collecting plate.

In the fuel battery of the present invention, one of the protrusions may be disposed at a center part of the anti-rust plate or the current-collecting plate.

According to the thus configured fuel battery, when the anti-rust plate and the current-collecting plate are overlaid so that the protrusion on one of the plates is fitted into the fitting hole in the other plate, the anti-rust plate and the current-collecting plate are aligned automatically.

The fuel battery of the present invention is capable of suppressing displacement of an anti-rust plate without upsizing the fuel battery.

BRIEF DESCRIPTION OF THE DRAWINGS

FIG. 1 is a side view of a fuel battery according to the present embodiment.

FIG. 2 is a schematic exploded perspective view of a fuel cell stack making up the fuel battery according to the present embodiment.

FIG. 4A is a perspective view of the anti-rust plate, and FIG. 4B is a cross-sectional view taken along the arrow A-A in FIG. 4A.

FIG. 5A is a perspective view of the current-collecting plate, and FIG. 5B is a cross-sectional view taken along the arrow B-B in FIG. 5A.

FIG. 6A is a perspective view of the anti-rust plate and the current-collecting plate, and FIG. 6B is a cross-sectional view taken along the arrow C-C in FIG. 6A.

DESCRIPTION OF THE PREFERRED EMBODIMENTS

The following describes one embodiment of a fuel battery according to the present invention, with reference to the drawings.

Figure 3:
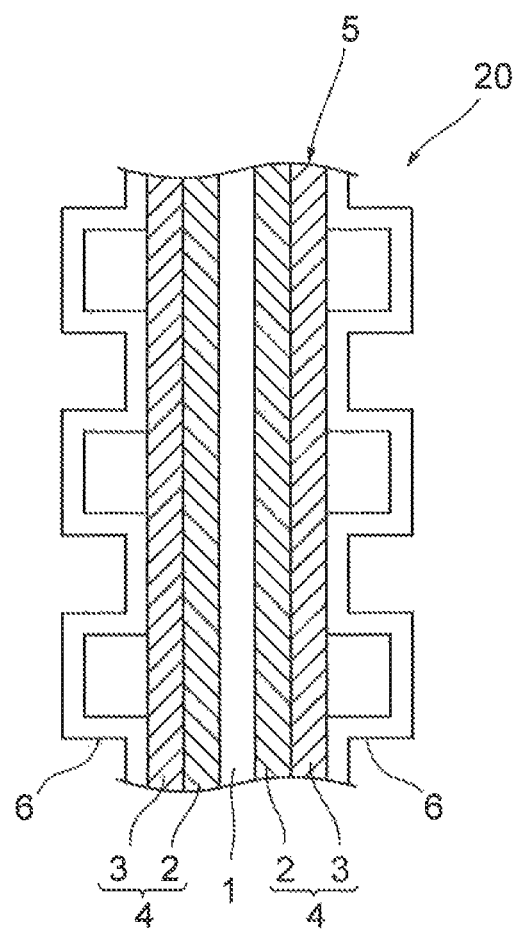
FIG. 3 is a cross-sectional view of a cell making up a cell laminated body of the fuel cell stack.

FIG. 1 is a side view of a fuel battery according to the present embodiment. FIG. 2 is a schematic exploded perspective view of a fuel cell stack making up the fuel battery according to the present embodiment. FIG. 3 is a cross-sectional view of a cell making up a cell laminated body of the fuel cell stack.

As illustrated in FIG. 1, a fuel battery 1 according to the present embodiment includes a fuel cell stack 12, and end plates 13 disposed at both ends of this fuel cell stack 12. The fuel battery 11 is mounted on a movable body, such as a vehicle, for use. The end plates 13 are fastened by fastening rods 14 for mutually coupling, and the fuel cell stack 12 is pressurized at predetermined load from the both end sides by such a fastening force.

As illustrated in FIG. 2, the fuel cell stack 12 includes a cell laminated body 21, current-collecting plates 22 and an anti-rust plate 23. The cell laminated body 21 is configured by stacking a plurality of cells 20.

As illustrated in FIG. 3, a cell 20 includes a membrane electrode assembly (MEA) 5, in which an electrode 4 including a catalyst layer 2 and a diffusion layer 3 is disposed on either side of an electrolyte membrane 1. On both faces of the membrane electrode assembly 5, separators 6 are disposed. The separators 6 are prepared by processing stainless steel into a plate form. The cell 20 is a unit module for power generation in the fuel battery 11, where hydrogen gas and oxygen contained in air undergo electrochemical reaction for power generation.

The current-collecting plates 22 are made of a conducting metal material, such as aluminum or stainless steel. The current-collecting plates 22 are provided with an output terminal not illustrated, and electricity generated at the fuel cell stack 12 is taken through the output terminal.

The anti-rust plate 23 is disposed between the cell laminated body 21 and the current-collecting plate 22 on the positive electrode side. With this configuration, the anti-rust plate 23 is sandwiched between the separator 6 of a cell 20 making up the cell laminated body 21 and the current-collecting plate 22. The anti-rust plate 23 is made of a metal material that is different from that of the current-collecting plates 22. The anti-rust plate 23 is made of a metal material, such as titanium, for example.

Figure 4A:
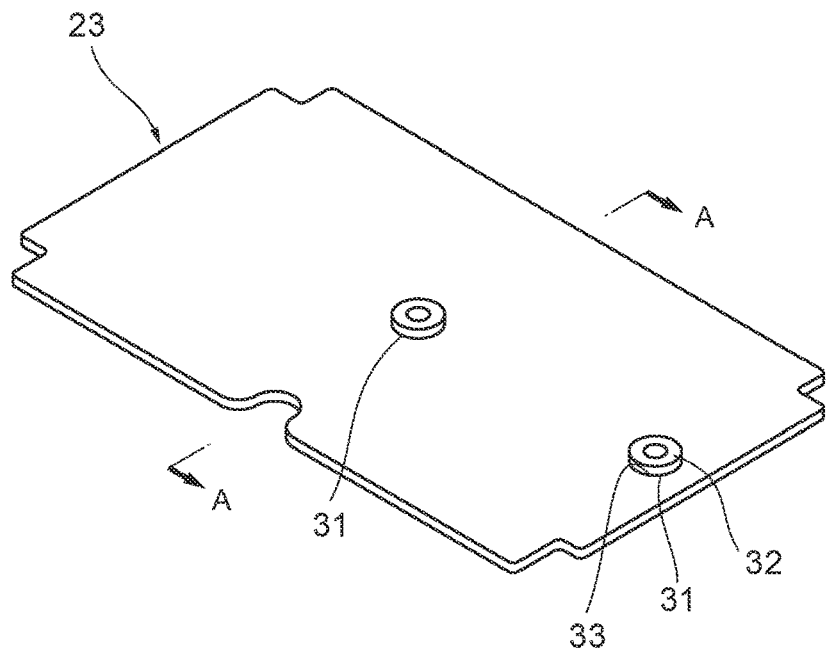
FIG. 4A and FIG. 4B illustrate an anti-rust plate, where
Figure 4B:
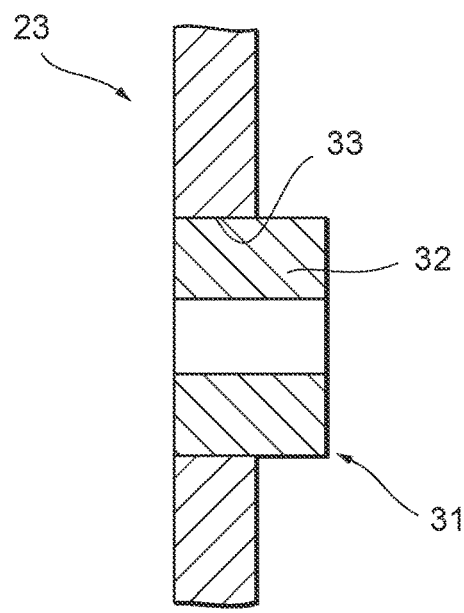
Figure 5A:
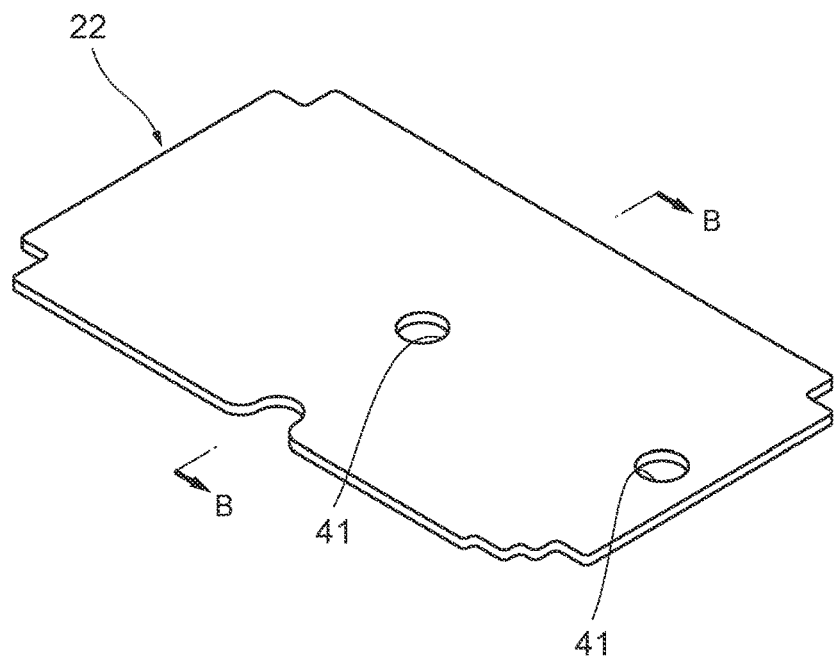
FIG. 5A and FIG. 5B illustrate a current-collecting plate, where
Figure 5B:
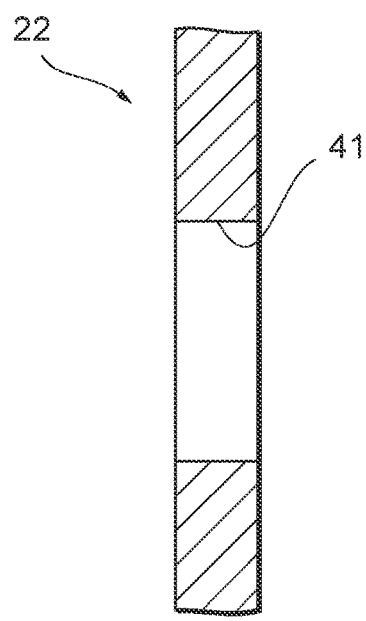
Figure 6A:
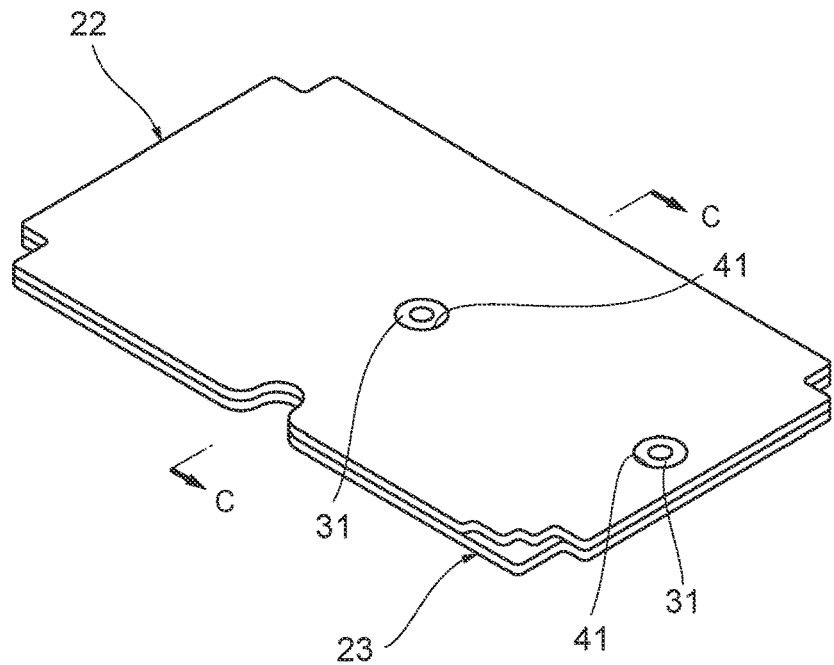
FIG. 6A and FIG. 6B illustrate the state where the anti-rust plate and the current-collecting plate are mutually overlaid, where
Figure 6B:
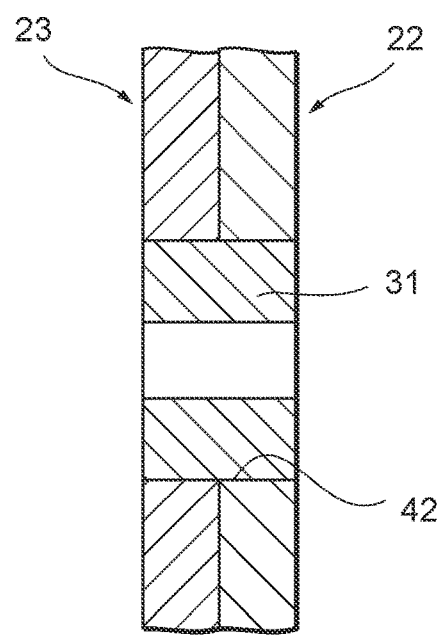

FIGS. 4A and 4B illustrate an anti-rust plate, where FIG. 4A is a perspective view of the anti-rust plate, and FIG. 4B is a cross-sectional view taken along the arrow A-A in FIG. 4A. FIGS. 5A and 5B illustrate a current-collecting plate, where FIG. 5A is a perspective view of the current-collecting plate, and FIG. 5B is a cross-sectional view taken along the arrow B-B in FIG. 5A. FIGS. 6A and 6B illustrate the state where the anti-rust plate and the current-collecting plate are mutually overlaid, where FIG. 6A is a perspective view of the anti-rust plate and the current-collecting plate, and FIG. 6B is a cross-sectional view taken along the arrow C-C in FIG. 6A.

As illustrated in FIGS. 4A and 4B, the anti-rust plate 23 is provided with protrusions 31. Two protrusions 31 are disposed on the anti-rust plate 23. One of the protrusions 31 is disposed at a center part of the anti-rust plate 23. The other protrusion 31 is disposed at an end part of the rectangular plate-formed anti-rust plate 23 on the side of the short side and at a center part in the short-side direction. That is, these two protrusions 31, 31 are disposed so that the straight line connecting the centers of the protrusions 31, 31 is parallel to the long sides of the anti-rust plate 23 in a planar view of the anti-rust plate 23.

These protrusions 31 protrude toward the current-collecting plate 22 that is to be overlaid with the anti-rust plate 23. The protrusions 31 have a protruding dimension that is the thickness of the current-collecting plate 22 or less. Each protrusion 31 includes a pin member 32, and this pin member 32 is pressed into a fixing hole 33 bored at the anti-rust plate 23, whereby the pin member is fixed to the anti-rust plate 23.

As illustrated in FIGS. 5A and 5B, the current-collecting plate 22 that is to be overlaid with the anti-rust plate 23 has fitting holes 41 bored therein. Two fitting holes 41 are bored at the current-collecting plate 22. These fitting holes 41 are bored at positions corresponding to the protrusions 31 on the anti-rust plate 23 when the current-collecting plate 22 and the anti-rust plate 23 are overlaid. Each fitting hole 41 has an inner diameter that is slightly larger than the outer diameter of the protrusions 31 of the anti-rust plate 23.

As illustrated in FIG. 6A, the anti-rust plate 23 having protrusions 31 and the current-collecting plate 22 having fitting holes 41 are mutually overlaid to configure the fuel cell stack 12. Then, when these anti-rust plate 23 and current-collecting plate 22 are overlaid, the protrusions 31 of the anti-rust plate 23 are fitted into the fitting holes 41 of the current-collecting plate 22 as illustrated in FIG. 6B, so that these plates are integrated in the mutually aligned state.

These overlaid anti-rust plate 23 and the current-collecting plate 22 are then stacked on the cell laminated body 21 on one end side, while on the other end side of the cell laminated body, the other current-collecting plate 22 is stacked, whereby the fuel cell stack 12 is configured. Then, the end plates 13 are placed at both ends of this fuel cell stack 12, and these end plates 13 are fastened by the fastening rods 14, whereby they are integrated while being pressurized at predetermined load to be the fuel battery 11.

In such a fuel battery 11 including the anti-rust plate 23, the anti-rust plate 23 is overlaid with the cell laminated body 21 for electrical conduction, whereby corrosion current flowing through the cells 20 making up the cell laminated body 21 can be reduced. That is, corrosion current flows more through the anti-rust plate 23 than through the separators 6 of the cells 20, whereby corrosion of the separators 6 of the cells 20 can be suppressed.

Figure 7:
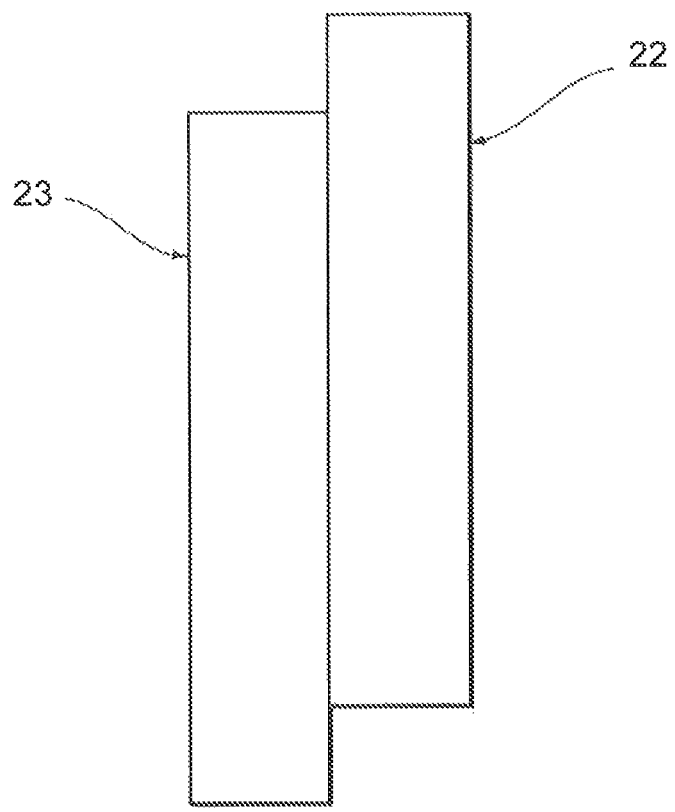
FIG. 7 is a schematic cross-sectional view to explain displacement of an anti-rust plate relative to a current-collecting plate.

Herein, the anti-rust plate 23 that is held while being pressurized and sandwiched between the cell laminated body 21 and the current-collecting plate 22 may be shifted for displacement in a planar direction due to imbalanced temperature distribution during power generation and a difference in thermal expansion of a metal different from the current-collecting plates 22 as illustrated in FIG. 7. In this case, a mechanism may be disposed around the fuel cell stack 12 so as to suppress the displacement of the anti-rust plate 23, for example. However, the fuel battery 11 provided with such a mechanism to suppress displacement will increase in size.

On the other hand, according to the fuel battery 11 of the present embodiment, the anti-rust plate 23 is provided with the protrusions 31, and the current-collecting plate 22 is provided with the fitting holes 41 into which the protrusions 31 are to be fitted. This allows the protrusions 31 to be fitted into the fitting holes 41, which can suppress displacement in a planar direction resulting from a difference in thermal expansion, for example, of the anti-rust plate 23 disposed between the cell laminated body 21 and the current-collecting plate 22 from that of the current-collecting plate 22.

This can suppress a problem, which may occur when the displaced anti-rust plate 23 comes into contact with a component therearound. Further as compared with the case of disposing a mechanism to suppress displacement of the anti-rust plate 23 around the current-collecting part including the current-collecting plates 22, an increase in size of the fuel battery can be suppressed.

A method for fastening the anti-rust plate 23 and the current-collecting plate 22 may include bonding using adhesive or double-faced adhesive tape, welding, brazing, soldering, riveting, screwing, caulking, fixing by attaching adhesive tape around the outer periphery, fixing by fastening the outer periphery using a fixer such as a pin, for example. All of them, however, require trouble for fastening. Further, bonding using adhesive or double-faced adhesive tape or fixing by attaching adhesive tape around the outer periphery may fail to obtain the effect to suppress displacement sufficiently, and fixing by fastening the outer periphery using a fixer such as a pin may increase the size of the fuel battery 11 because the fixer sticks out from the outer periphery.

In the above embodiment, the protrusions 31 are disposed on the anti-rust plate 23, and the fitting holes 41 are disposed in the current-collecting plate 22. Instead, the protrusions 31 may be disposed on the current-collecting plate 22 and the fitting holes 41 may be disposed in the anti-rust plate 23, or protrusions 31 and fitting holes 41 that mutually fit may be disposed at both of the anti-rust plate 23 and the current-collecting plate 22. When the anti-rust plate 23 has a waterproof function for cooling water, the fitting holes 41 disposed in the anti-rust plate 23 do not penetrate through the anti-rust plate 23 so as to avoid leaking of cooling water from the fitting holes 41.

In the above embodiment, the anti-rust plate 23 is disposed between the current-collecting plate 22 on the positive electrode side that is on a high-potential side and the cell laminated body 21. Instead, the anti-rust plate may be disposed between the current-collecting plate 22 on the negative electrode side and the cell laminated body 21.

11 fuel battery
20 cell
21 cell laminated body
22 Current-collecting plate
23 anti-rust plate
31 protrusion
41 fitting hole

What is claimed is:

1. A fuel battery, comprising a cell laminated body including lamination of a plurality of cells, a current-collecting plate disposed at an end of the cell laminated body, the current-collecting plate being made of a metal material, and an anti-rust plate disposed between the cell laminated body and the current-collecting plate, the anti-rust plate including a face that mates with a corresponding face of the current-collecting plate, and the anti-rust plate being made of a metal material having a different thermal expansion from the metal material of the current-collecting plate, wherein
   the anti-rust plate has a plurality of protrusions with sides extending perpendicular to the face of the anti-rust plate, each of the protrusions being disposed so as to protrude from the anti-rust plate toward the current-collecting plate, and
   the current-collecting plate includes a plurality of fitting holes, each of the fitting holes including internal sides extending perpendicular to the face of the current-collecting plate and being configured to receive a corresponding one of the protrusions, each of the fitting holes being disposed in the current-collecting plate at a respective position corresponding to a respective one of the protrusions of the anti-rust plate,
   and
   the protrusions are disposed so that a straight line connecting centers of the protrusions is substantially parallel to sides of the anti-rust plate in a planar view of the anti-rust plate.

* * * * *